(12) United States Patent
Lam et al.

(10) Patent No.: US 7,784,041 B2
(45) Date of Patent: Aug. 24, 2010

(54) MECHANISM FOR REDUCING DETECTABLE PAUSES IN DYNAMIC OUTPUT CAUSED BY DYNAMIC COMPILATION

(75) Inventors: Ioi K. Lam, Mountain View, CA (US); Oleg A. Pliss, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1182 days.

(21) Appl. No.: 11/395,985

(22) Filed: Mar. 30, 2006

(65) Prior Publication Data

US 2007/0234317 A1 Oct. 4, 2007

(51) Int. Cl.
*G06F 9/45* (2006.01)
(52) U.S. Cl. .................. 717/151; 717/136; 717/139; 717/148; 717/152; 717/153
(58) Field of Classification Search .......... 717/130–153
See application file for complete search history.

(56) References Cited

U.S. PATENT DOCUMENTS

| | | | | |
|---|---|---|---|---|
| 5,535,391 A | * | 7/1996 | Hejlsberg et al. | 717/140 |
| 5,946,487 A | * | 8/1999 | Dangelo | 717/148 |
| 5,970,249 A | * | 10/1999 | Holzle et al. | 717/153 |
| 5,995,754 A | * | 11/1999 | Holzle et al. | 717/158 |
| 5,996,060 A | * | 11/1999 | Mendelson et al. | 712/205 |
| 6,189,141 B1 | * | 2/2001 | Benitez et al. | 717/153 |
| 6,240,548 B1 | * | 5/2001 | Holzle et al. | 717/140 |
| 6,332,216 B1 | * | 12/2001 | Manjunath | 717/141 |
| 6,412,108 B1 | * | 6/2002 | Blandy et al. | 717/152 |
| 6,637,025 B1 | * | 10/2003 | Beadle et al. | 717/148 |
| 6,883,165 B1 | * | 4/2005 | Blandy et al. | 717/148 |
| 6,993,755 B1 | * | 1/2006 | Ungar | 717/158 |

(Continued)

FOREIGN PATENT DOCUMENTS

EP        0908818        4/1999

(Continued)

OTHER PUBLICATIONS

European Patent Office, "Eurpean Search Report", Application No. 07251226.2/2211, dated Feb. 4, 2009, 12 pages.

(Continued)

*Primary Examiner*—Anna Deng
*Assistant Examiner*—Sao Lu
(74) *Attorney, Agent, or Firm*—Osha • Liang LLP

(57) ABSTRACT

A method is disclosed for reducing dynamic pauses during dynamic compilation. Applications running on a system detect the rendering of dynamic output to a user. The dynamic output represents a change in visual or audio data while any application is running. When an application detects such output it notifies the system, which monitors the frequency of the dynamic output. If the frequency of the dynamic output exceeds a threshold, the system informs a compiler on the system to suspend compilation. Compilation normally occurs when an interpreter on the system is instructed to pass processing control to the compiler. One way this occurs is if a method currently being processed by the interpreter has been marked for compilation. Thus, in order to suspend compilation, the compiler ceases to mark methods for compilation so that the interpreter will not be instructed to pass processing control to the compiler.

12 Claims, 6 Drawing Sheets

U.S. PATENT DOCUMENTS

| | | | |
|---|---|---|---|
| 7,065,751 B2 * | 6/2006 | Hagiwara et al. | 717/139 |
| 7,089,544 B2 * | 8/2006 | Hickson | 717/148 |
| 7,097,099 B2 * | 8/2006 | Hepworth et al. | 235/435 |
| 7,124,407 B1 * | 10/2006 | Wallman | 717/154 |
| 7,154,621 B2 * | 12/2006 | Rodriguez et al. | 358/1.15 |
| 7,174,545 B2 * | 2/2007 | Keim et al. | 717/148 |
| 7,222,336 B2 * | 5/2007 | Willis | 717/148 |
| 7,290,254 B2 * | 10/2007 | Comp et al. | 717/158 |
| 7,350,200 B2 * | 3/2008 | Lueh et al. | 717/148 |
| 7,370,318 B1 * | 5/2008 | Howe et al. | 717/110 |
| RE40,509 E * | 9/2008 | Pechanek et al. | 712/227 |
| 7,451,389 B2 * | 11/2008 | Huynh et al. | 715/230 |
| 7,509,634 B2 * | 3/2009 | Kyo | 717/161 |
| 7,516,459 B2 * | 4/2009 | Nagendra et al. | 719/328 |
| 7,568,190 B2 * | 7/2009 | Creamer et al. | 717/148 |
| 2004/0001100 A1 * | 1/2004 | Wajda | 345/778 |
| 2004/0034847 A1 * | 2/2004 | Joffrain et al. | 717/113 |
| 2004/0054965 A1 * | 3/2004 | Haskell et al. | 715/501.1 |
| 2004/0073904 A1 * | 4/2004 | Hill | 718/1 |
| 2004/0243989 A1 * | 12/2004 | Owens et al. | 717/151 |
| 2004/0261067 A1 * | 12/2004 | Komatsu et al. | 717/158 |
| 2005/0080771 A1 * | 4/2005 | Fish | 707/3 |
| 2005/0091690 A1 * | 4/2005 | Delpuch et al. | 725/88 |
| 2006/0229813 A1 * | 10/2006 | Tobiska | 702/2 |
| 2006/0256130 A1 * | 11/2006 | Gonzalez | 345/619 |
| 2007/0076010 A1 * | 4/2007 | Swamy et al. | 345/565 |
| 2007/0226698 A1 * | 9/2007 | Cascaval et al. | 717/127 |

FOREIGN PATENT DOCUMENTS

EP 0908819 4/1999

OTHER PUBLICATIONS

Claims, Application No. 07251226.2/2211, 4 pages.
Sun Microsystems, "CLDC HotSpot Implementation Virtual Machine", White Paper, XP002511401, Feb. 2005, 24 pages.
Holzle, et al., "Reconciling Responsiveness with Performance in Pure Object-Oriented Languages", XP002134382, ACM Transactions on Programming Language and Systems, ACM, vol. 18, No. 4, Jul. 2006, 46 pages.

* cited by examiner

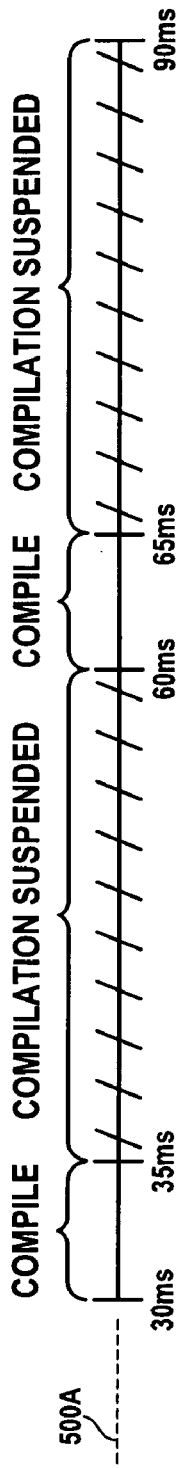
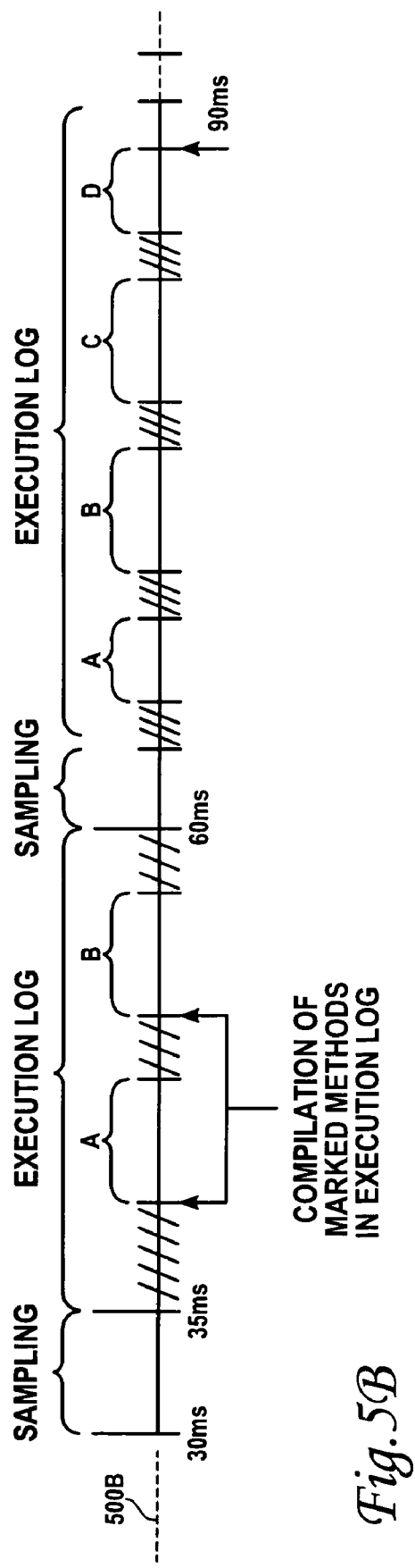

MECHANISM FOR REDUCING DETECTABLE PAUSES IN DYNAMIC OUTPUT CAUSED BY DYNAMIC COMPILATION

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programming languages such as Sun Microsystem's Java® programming language allow programmers to develop applications in one language for many platforms with relative ease, allowing more resources to be spent on the development of a product rather than ensuring interoperability.

In a typical Java implementation, whenever a Java application is executed, an instance of a Java virtual machine (JVM) is also started to support the execution of the Java application. The JVM, which may be in native code, interprets and executes Java bytecodes. Java bytecodes are derived from Java source code, which is created and understood by a human programmer. The bytecodes act as an intermediate level of code. A Java program may by executed on any platform on which a JVM is executing.

Sometimes, it is more desirable to execute Java applications in native machine code rather than having the JVM interpret bytecodes. In such instances, bytecodes can be compiled into native machine code by a compiler, typically referred to as a just-in-time or JIT compiler. By doing so, the JVM enables a particular application to be executed faster (rather than using a Java interpreter to execute the Java bytecodes of the application, the application is executed directly by the processor, which is faster).

The JVM includes a sampling mechanism for triggering the compilation of bytecodes down to native machine code at certain intervals. For instance, a sampling mechanism may be set to trigger compilation every thirty milliseconds. However, compilation consumes system resources that could be used for other purposes. Thus, in order to minimize the effect of compilation, the JVM may set a limit on compilation such that compilation may only occur for five milliseconds at a time, for example. This is especially useful in single processor systems with only enough resources to run one processor thread at a time. By limiting compilation via the sampling mechanism, the JVM guarantees that compilation will not weigh down system resources by occupying too much time on the processor thread.

One drawback of the sampling mechanism is the static nature of the compilation. Compilation is set to take place at specific times and is limited to a certain duration. However, for processor intensive programs, such as benchmarking applications, it may be desirable to compile as many methods as possible in order to maximize the efficiency of execution. For such instances, in addition to sampling, some virtual machines employ the dynamic compilation of "hot methods" (methods that are invoked frequently within a certain period of time). Hot methods are compiled by tracking a list of recently executed methods. Each method in the list is marked, causing the method to be compiled for native execution instead of interpretive execution.

One of the drawbacks of the dynamic compilation of hot methods, however, is that the compiler can quickly consume a disproportionate amount of system resources. This is especially true if there is a large number of hot methods. This can adversely affect other system functions, such as the rendering of dynamic output such as video or audio. For example, the frames of a video animation may not refresh at a necessary rate if there is not enough processing power, causing a viewer of an animation to perceive an undesirable stutter, pause or blank image.

From the above discussion, it is clear that neither the static sampling approach nor the dynamic compilation of hot methods approach, by themselves, provide wholly satisfactory results. Thus, an improved mechanism for managing compilation is needed.

SUMMARY

In accordance with one embodiment of the present invention, there is provided a method for reducing detectable pauses in dynamic output caused by dynamic compilation. Dynamic output is defined as output that changes frequently. Examples of dynamic output may be motion video, animation or audio. According to this method, applications running on a system with a virtual machine send output to a user interface to be rendered to a user. Whenever an application sends such output, the application invokes a method which notifies the virtual machine that such output has occurred. Such notification that output has occurred is forwarded by the virtual machine to a dynamic output monitor that tracks the frequency of the output.

The dynamic output monitor compares the frequency of the output against a threshold to determine whether the output is dynamic output and whether compilation on the virtual machine should be suspended or continued. If the frequency of the output exceeds the threshold, the dynamic output monitor changes the value of a global dynamic output indicator to inform other components of the system to suspend compilation. In particular, the global dynamic output indicator is used to inform a compiler on the system whether to continue marking methods for compilation.

Compilation occurs when an interpreter on the system is instructed to pass control of method processing to a compiler. Once processing control is passed to the compiler, the compiler checks the global dynamic output indicator to determine whether the dynamic output monitor has requested that compilation be suspended. If so, the compiler will suspend compilation by not marking any methods for compilation. Methods are usually marked for compilation if they are "hot methods" located in a log of recently interpreted methods. Recently interpreted methods are those methods which have been recently executed by a Java interpreter. By not marking methods for compilation, the next time those methods are handled by the interpreter, the interpreter will not pass processing control of the method to the compiler; thus, compilation is not performed. Because compilation is not performed, more resources are made available for rendering dynamic output to a user. This is turn reduces the likelihood that the user will experience detectable pauses in the dynamic output. In this manner, this embodiment of the present invention allows hot methods to be dynamically compiled. However, when dynamic output is being rendered, the compilation of hot methods is suspended to give the output rendering mechanisms the processing resources that they need to render the dynamic output. By automatically controlling dynamic compilation in this way, it is possible to reap the benefits of hot method compilation without adversely affecting the operation of other parts of a system.

DESCRIPTION OF THE DRAWINGS

The present invention is illustrated by way of example, and not by way of limitation, in the figures of the accompanying drawings and in which like reference numerals refer to similar elements and in which:

FIG. 5A is a block diagram illustrating a processing thread during operation of a sampling mechanism according to one embodiment;

FIG. 5B is a block diagram illustrating a processing thread during the dynamic compilation of hot methods according to one embodiment.

DETAILED DESCRIPTION OF EMBODIMENT(S)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Structural Overview

Figure 1:
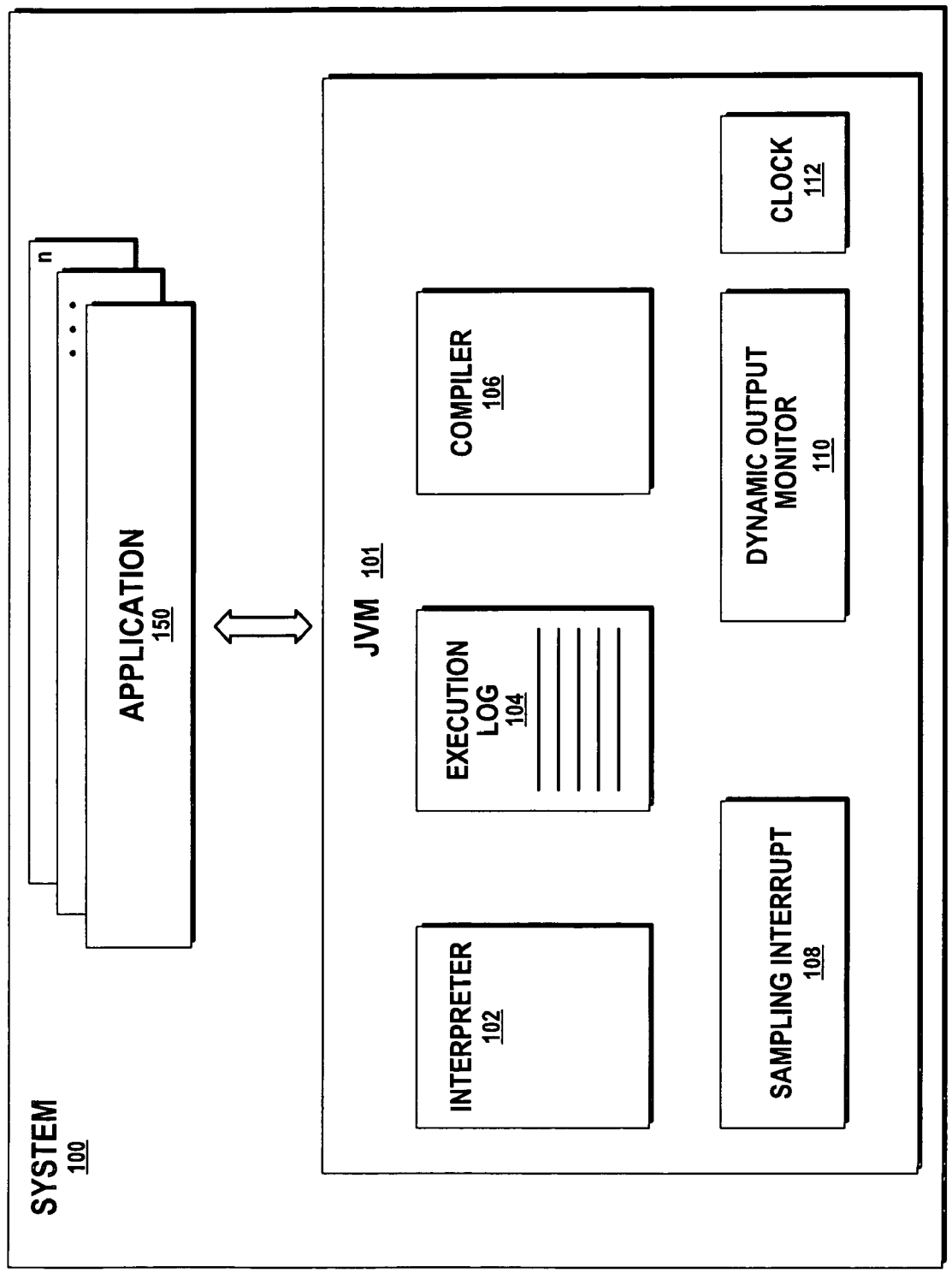
FIG. 1 is an overview of a system in which one embodiment of the present invention may be implemented.

Referring now to FIG. 1, there is shown a block diagram of a system 100 in which one embodiment of the present invention may be implemented. For the sake of illustration, an embodiment of the present invention will be described with reference to a JVM 101 on system 100. It should be noted, however, that the invention is not limited to such an embodiment, and does not need to be implemented by a JVM. Rather, any system capable of performing the process as described herein may be used. Examples of system 100 may include a handheld computing device, personal digital assistant, mobile phone, portable computer, personal computer, or any other type of computing system for performing the described process.

As shown, JVM 101 includes, among other things, an Interpreter 102 and Compiler 106. Interpreter 102 and Compiler 106 are used by JVM 101 to process methods called by Applications 150 on system 100. Interpreter 102 executes methods interpretively by executing bytecodes. Further, Interpreter 102 logs the execution of methods using Execution Log 104. While processing methods, Interpreter 102 is also responsible for determining whether processing control should be passed to Compiler 106.

Compiler 106 compiles bytecodes into native code in a process known as compilation. During compilation, Compiler 106 is invoked to translate the bytecodes of a method into native executable code, which is in turn executed by one or more processors on system 100. Further, Compiler 106 is responsible for a number of other tasks. For instance, according to one embodiment, Compiler 106 is also responsible for determining whether to mark methods in Execution Log 104 for future compilation.

Execution Log 104 contains a listing of methods recently executed by Interpreter 102. Methods logged in Execution Log 104 are labeled "hot methods", which are methods that have been executed above a particular frequency by Interpreter 102 during a set interval. For instance, according to one embodiment, Execution Log 104 may be a queue with a size of twenty queue spaces, each queue space representing a recently interpreted method. As such, Execution Log 104 will only keep track of the last twenty methods executed by Interpreter 102. Whenever a method is executed by Interpreter 102, the method is logged in Execution Log 104. Subsequent processing of additional methods causes the original method to be pushed out of Execution Log 104. However, if the original method is executed again within twenty methods, it will re-enter the Execution Log 104 and remain a hot method.

Hot methods in Execution Log 104 are marked for compilation by Compiler 106. For example, whenever it gains processing control from Interpreter 102, Compiler 106 will usually mark all methods in Execution Log 104 for compilation. However, in order to balance the compilation of hot methods with processing power needed to render dynamic output to a user without detectable pauses, Compiler 106 also monitors for the existence of dynamic output. The dynamic output may be any type of output, such as video, animation, audio or any other type of output that changes frequently. Based on whether dynamic output is currently being rendered, Compiler 106 can dynamically control the compilation of hot methods by deciding not to mark methods in Execution Log 104 for compilation.

The JVM 101 also includes a Sampling Interrupt 108. A sampling interrupt is a mechanism used to trigger the compilation of methods by Compiler 106. In order to achieve this, in one embodiment, Sampling Interrupt 108 assigns a value to a global variable which Interpreter 102 checks during the execution of a method. The value of the global variable is used to indicate whether the sampling trigger has been flagged. The sampling trigger allows Interpreter 102 to recognize that control of the processing thread needs to be given to Compiler 106 for compilation. While Interpreter 102 is processing or interpreting the method, Interpreter 102 determines whether the Sampling Interrupt 108 has flagged the sampling trigger based on the value set for the global variable. If the sampling trigger is flagged, Interpreter 102 will hand over control of the processor thread to Compiler 106.

Similarly, by marking methods in Execution Log 104, Compiler 106 causes the same global variable used by Sampling Interrupt 108 to inform Interpreter 102 whether to pass processing control to Compiler 106. Thus, the next time that Interpreter 102 executes a marked method, the Interpreter 102 will recognize that the sampling trigger has been flagged and pass processor control to Compiler 106. Once Compiler 106 has processing control, Compiler 106 determines whether to mark methods in Execution Log 104. To determine whether to mark methods in Execution Log 104, Compiler 106 first determines if dynamic output is being rendered. In order for this to occur, JVM 101 must recognize that dynamic output is being rendered by communicating with Applications 150.

Applications 150 run on system 100 and call methods for execution by JVM 101. According to one embodiment, any time an Application 150 renders output to a user-interface, such as a change in display or audio during the presentation of multimedia, Application 150 will invoke an output indicator to inform JVM 101 of the output. For instance, assume that Application 150 is a graphical game application running on system 100. Application 150 will sense that the visual output of the game has changed from one frame to the next and call the output indicator, which is used to inform components of JVM 101 that output is currently being rendered. According to one embodiment, when the output indicator is called, JVM 101 processes the output indication using a Dynamic Output Monitor 110.

Dynamic Output Monitor 110 is responsible for monitoring calls of the output indicator by Applications 150. For instance, every time Application 150 calls the output indicator, Dynamic Output Monitor 110 will log the occurrence using Clock 112 to track the frequency that output is reported from Application 150. If Dynamic Output Monitor 110 determines that the frequency of output has passed a particular threshold, such as a certain number of calls in a minute, then Dynamic Output Monitor 110 will cause a global variable to be set which indicates that the output being displayed is dynamic output.

Dynamic Output Monitor 110 continues to monitor the calls of the output indicator by all applications. If calls of the output indicator fall below the set threshold, Dynamic Output Monitor 110 can change the global variable to indicate that the output being displayed is not dynamic output.

Using the global variable, Compiler 106 can determine whether or not to mark methods in Execution Log 104 for compilation, thus dynamically controlling the compilation of methods during the rendering of dynamic output.

Functional Overview

Monitoring for Dynamic Output

Figure 2:
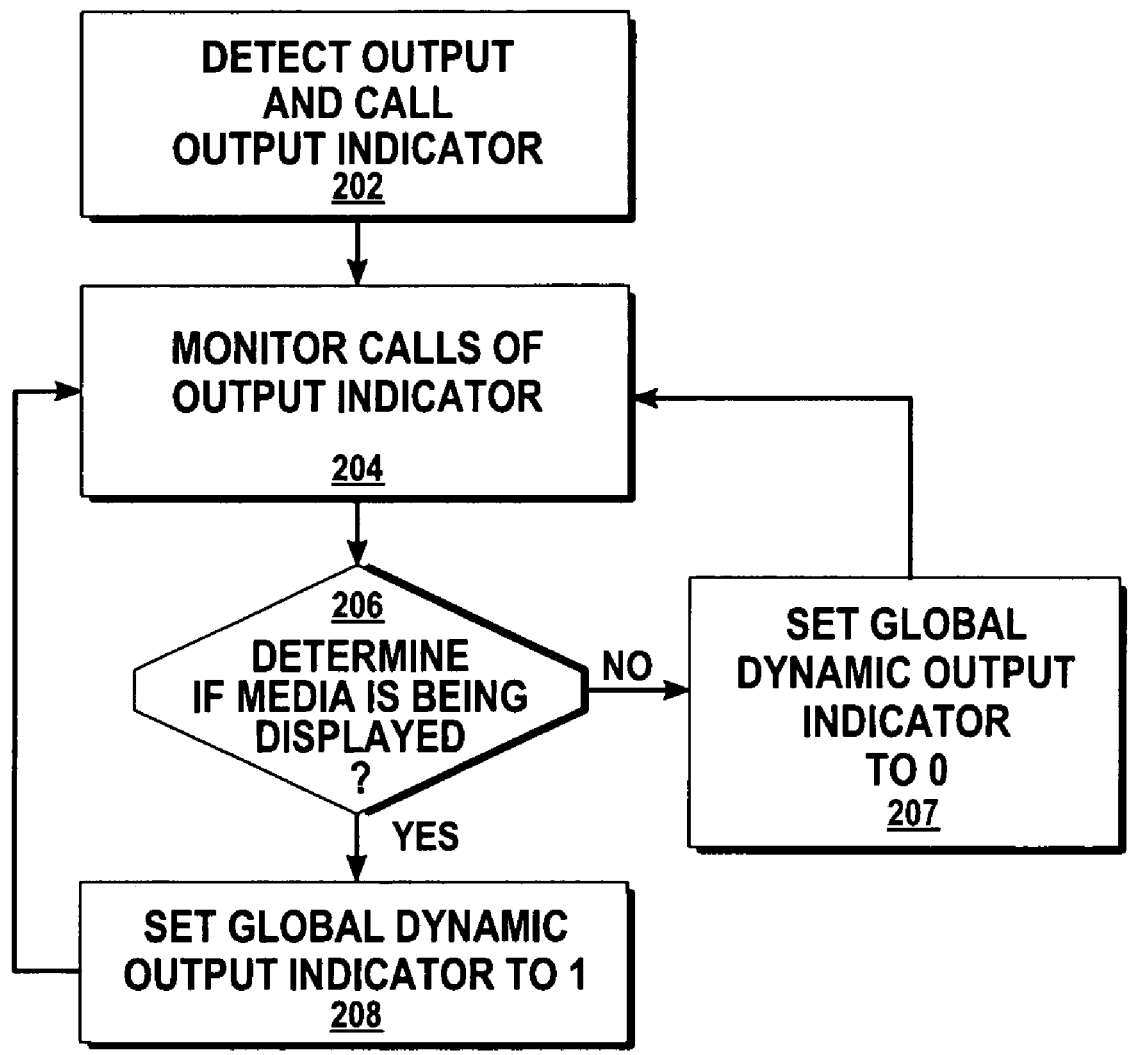
FIG. 2 is a flow diagram illustrating the operation a flow diagram illustrating the operation of a dynamic output monitor in accordance with one embodiment of the invention is shown.

Referring now to FIG. 2, a flow diagram illustrating the operation of a Dynamic Output Monitor 110 and any Applications 150, in accordance with one embodiment of the invention is shown. At step 202, when an Application 150 sends output to a user interface of system 100, Application 150 also calls an output indicator. The output sent to the user interface may, for example, be a change of pixels on a display screen or a new set of audio data. Therefore, according to one embodiment, in response to a change in pixels or audio data, an Application 150 is responsible for invoking the output indicator in order to inform JVM 101 of the output. According to one embodiment, the output indicator may be an instance of a custom Java class which indicates the presence of output to JVM 101.

When an Application 150 calls the output indicator, JVM 101 forwards the indication to the Dynamic Output Monitor 110. Thus, at step 204, Dynamic Output Monitor 110 monitors the calls of the output indicator. Utilizing Clock 112, Dynamic Output Monitor 110 determines the frequency of reported output within a set amount of time. According to one embodiment, Dynamic Output Monitor 110 actively monitors the output indicator calls by creating a ratio representing the amount of method calls in a particular amount of time. For example, Dynamic Output Monitor 110 can create a ratio value every second to determine how many times the output indicator has been called each second. Thus, if the output indicator has been called four times in one second, for instance, the reported ratio will be 4.

Using this ratio, the Dynamic Output Monitor 110 compares the value of the ratio to the threshold ratio in order to determine if dynamic output is currently being rendered. The threshold ratio represents the maximum allowed detections of output per amount of time before compilation should be suspended. The higher the threshold ratio, the more likely compilation will be allowed to occur. Similarly, a low threshold ratio ensures that compilation will be less likely to cause stutters or pauses during the rendering of dynamic output.

According to one embodiment, the value of the threshold ratio may be set and changed automatically by system 100, JVM 101, or any other component such as Applications 150. For instance, any component of System 100 may determine that, at any given point in time, compilation of methods for the purpose of efficiency outweighs the effect of any pauses or stutters in the dynamic output. Thus, if the value of the threshold ratio is originally at 2, a component of System 100 may cause the value to increase to 5. Alternatively, in another embodiment, the threshold ratio may be manually set by a user of System 100.

Note that although the Dynamic Output Monitor 110 determines whether dynamic output is being rendered by comparing the above mentioned ratio with a threshold ratio, the invention is not limited to such an embodiment, and Dynamic Output Monitor 110 may determine whether dynamic output is being rendered by any other method which tracks the calls of the output indicator from Applications 150.

Referring now back to FIG. 2, at step 206, Dynamic Output Monitor 110 determines if dynamic output is being rendered using the process described above. After making such a determination, according to one embodiment, Dynamic Output Monitor 110 will cause the value of a global variable to change. The variable is defined as a "global" variable because it is accessible to any component or object of System 100. The global variable is used to communicate the existence of dynamic output to all components or objects on System 100. This global variable is referred to hereinafter as the "global dynamic output indicator". Thus, after determining whether dynamic output is being rendered, Dynamic Output Monitor 110 assigns a value of 0 or 1 to the global dynamic output indicator at steps 207 or 208, respectively.

If the value of the threshold ratio is higher than the frequency of output indicator calls, at step 207, the value of the global dynamic output indicator is set to 0. In this instance, other components of System 100 may be configured to recognize that if the global dynamic output indicator is set to 0 that no dynamic output is being rendered.

However, if the frequency of output indicator calls is higher than the threshold ratio, at step 208, the value of the global dynamic output indicator is set to 1, and the components of System 100 may be configured to recognize that such a value indicates that dynamic output is currently being rendered.

Because the Dynamic Output Monitor 110 actively sets the global dynamic output indicator to a value of 0 or 1, components of system 100 and JVM 101 are continuously updated as to whether dynamic output is being rendered or not. Further, although it has been described that the global dynamic output indicator may be set to a value of 0 or 1, the invention is not limited to such an embodiment, and the global dynamic output indicator may be set to any value. For instance, in other embodiments, the global dynamic output indicator may be set to any number of values representing a spectrum of dynamic output. Specifically, a value of 0 may indicate that no dynamic output is currently being rendered while a value of 5 may indicate that dynamic output is being rendered very frequently. Further, any value in between 0 and 5 may represent different frequencies of dynamic output. Using the values of the global dynamic output indicator, according to one embodiment, dynamic compilation may be variably controlled during dynamic output according to the frequency of the dynamic output.

Interpretive Processing of Methods

Figure 3:
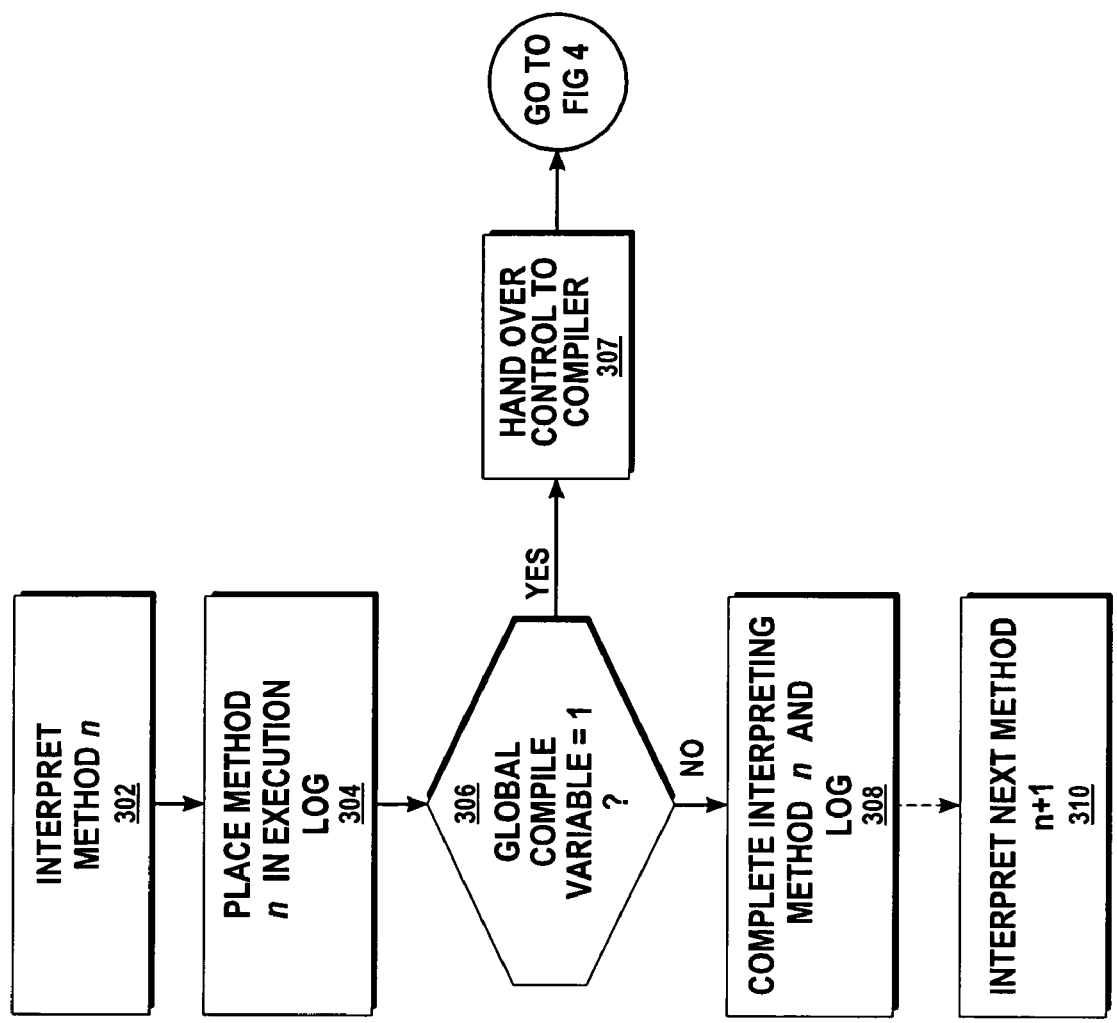
FIG. 3 is a flow diagram illustrating the operation of an interpreter in accordance with one embodiment of the invention.

While the Dynamic Output Monitor 110 is monitoring for dynamic output, Applications 150 are invoking methods for execution by JVM 101. Suppose, for the purpose of example, that a method n has recently been called by an Application 150 running on System 100. Referring now to FIG. 3, a flow diagram illustrating the operation of an Interpreter 102 is shown in accordance with one embodiment of the invention. When method n is called, JVM 101 passes the method to the Interpreter 102 for interpretive execution. At step 302, Interpreter 102 executes method n interpretively in bytecodes.

During interpretive execution, or alternatively at any other time, at step 304, an entry of method n is placed in the Execution Log 104. Because an entry of method n has been made in Execution Log 104, method n will normally be marked for compilation when processing control passes to Compiler 106. As described below, Compiler 106 is responsible for marking any method in Execution Log 104 depending on whether dynamic output is being rendered. Because method n is marked for compilation, the next time method n is executed interpretively Interpreter 102 will pass processing control to Compiler 106, causing method n to be compiled using the process as described herein.

After placing a log of method n in Execution Log 104, at step 306, Interpreter 102 determines whether a sampling trigger has been flagged. The sampling trigger is used to indicate whether Interpreter 102 should hand over processing control to Compiler 106. According to one embodiment, the sampling trigger may be flagged in two ways: (1) the sampling mechanism has been triggered or (2) a method that has been marked for compilation by Compiler 106 is currently being executed interpretively by Interpreter 102. The only difference between the two scenarios is that the sampling mechanism of the first scenario forces the sampling trigger to be flagged at specific intervals while the hot methods in the second scenario may force the sampling trigger to be flagged at any given time depending on which methods are marked for compilation by Compiler 106.

According to one embodiment, to determine if the sampling trigger has been flagged, Interpreter 102 checks the value of another global variable referred to hereinafter as the "global compile variable." The global compile variable notifies Interpreter 102 whether to hand over processing control to Compiler 106. If the global compile variable has a value of 1, the sampling trigger has been flagged, and Interpreter 102 will hand over processing control to Compiler 106. If not, the global compile valuable remains 0. If the global compile variable value is 0, then Interpreter 102 will complete interpretively executing method n and at step 308, interpretively execute the next invoked method n+1.

However, at step 306, if it is determined that the sampling trigger has been flagged because the value of the compile variable is 1, at step 308, Interpreter 102 hands over processing control to Compiler 106.

Dynamic Compilation of Methods

According to one embodiment, system 100 is a single processing thread system, meaning that no component of system 100 may perform any action unless it has obtained processing control. Hence, Compiler 106 will not perform any actions until it receives processing control from Interpreter 102 as described above. When Compiler 106 receives processing control it performs a number of operations as described herein before returning processing control to Interpreter 102.

Figure 4:
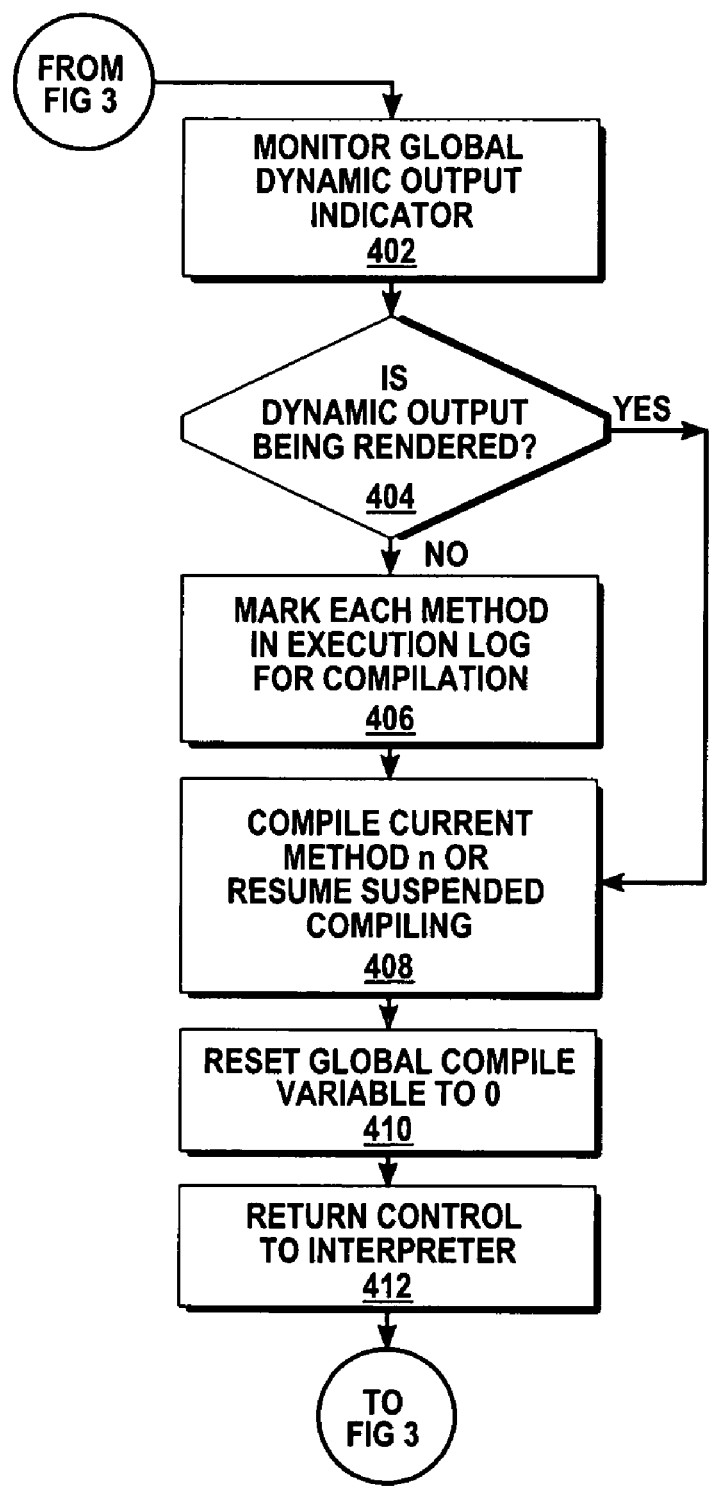
FIG. 4 is a flow diagram illustrating the operation of a compiler is shown in accordance with one embodiment of the invention.

Referring now to FIG. 4, a flow diagram illustrating the operation of a Compiler 106 is shown in accordance with one embodiment of the invention. When Compiler 106 is in operation, i.e., gains processing control, at step 402, the Compiler checks the value of the global dynamic output variable which was set by the Dynamic Output Monitor 110 as described above. Thus, according to one embodiment, at step 404, Compiler 106 determines if the output being displayed is dynamic output by examining the value of the global media variable set by the JVM 101. For instance, if the global dynamic output variable was set to a value of 0, Compiler 106 will determine that dynamic output is not currently being produced and at step 406, will continue to mark each method in Execution Log 104 for compilation as done in the normal operation of Compiler 106.

According to one embodiment, marking a method within Execution Log 104 causes the sampling trigger to be flagged when the method is called again. In one embodiment, this is accomplished by inserting one or more instructions representing a variable declaration into the instance of that method which is being called. The next time the method is called by JVM 101, the variable declaration will cause that particular variable to change values.

For instance, in one embodiment, if method n was marked for compilation, Compiler 106 will cause instructions representing a variable declaration for the global compile variable to be set to a value of 1 the next time method n is called. Thus, when Interpreter 102 is executing method n, according to the process described in FIG. 3, Interpreter 102 will determine that the sampling trigger has been flagged because the global compile variable has been set to a value of 1 (see step 306 in FIG. 3). In response, Interpreter 102 will pass processing control to Compiler 106. This in turn causes the compiler to begin compiling method n.

However, if dynamic output is currently being rendered, Compiler 106 will not mark any methods in Execution Log 104 so that processing control will not pass back to Compiler 106 during execution of those methods. Referring back to step 404, if Compiler 106 determines that dynamic output is being rendered because the value of the global dynamic output indicator has been set to 1, Compiler 106 will skip step 406 and proceed directly to step 408. Hence, when it is determined that dynamic output is being rendered, Compiler 106 will not mark any methods in Execution Log 104, which means that the global compile variable will not be set to 1 when those methods are invoked. When the Interpreter 102 begins to process those methods, it will determine that the compilation trigger has not been flagged.

At step 408, Compiler 106 begins to compile method n by translating the byte code instructions of method n into native code for native execution by one or more processors on system 100. Alternatively, instead of compiling the current method n, Compiler 106 can proceed to resume compilation on a previous method. For instance, according to one embodiment, the JVM 101 limits the amount of time compilation is allowed to occur at five milliseconds.

Assume that the maximum compilation time is five milliseconds. If Compiler 106 was previously compiling a method n−1 and could not complete the compilation in five milliseconds, Compiler 106 would mark the progress of compilation for method n−1 and return processing control to Interpreter 102. However, the next time it gains processing control, Compiler 106 can resume compilation of method n−1 at the point it suspended compilation. According to one embodiment, compilation of partially-compiled methods takes priority over methods that have not yet been compiled at all. Thus, even if the Compiler gains control of the processing thread during the execution of method n, method n−1 will be compiled first, and Compiler 106 can queue method n to be next in line for compilation.

Alternatively, if a method n−1 has been fully compiled, Compiler 106 causes method n−1, now in native code, to be executed the next time the method is called at JVM 101 and continues to compile new methods or methods that have been partially compiled.

At step 410, the Compiler 106 resets the global compile variable to 0. Compiler 106 resets the compile variable in order to ensure that Interpreter 102 will only pass control to Compiler 106 by virtue of the sampling mechanism or because some method n is marked for compilation. Thus, because the global compile variable is reset to 0, Interpreter 102 will not pass processing control to Compiler 106 upon execution of the next method n+1 unless (1) the sampling trigger has been flagged, or (2) method n+1 has been marked by Compiler 106 for compilation, thus causing the global compile variable to be set to a value of 1 once again.

Further, according to one embodiment, Compiler 106 resets the global compile variable to 0 once the compiler has reached its maximum time limit set by JVM 101. For instance, compilation may be limited to a maximum of 5 milliseconds. Thus, if 5 milliseconds have passed since processing control was obtained, Compiler 106 will proceed to step 410, reset the compile variable to 0 and return processing control to Interpreter 102 at step 412.

Figure 6:
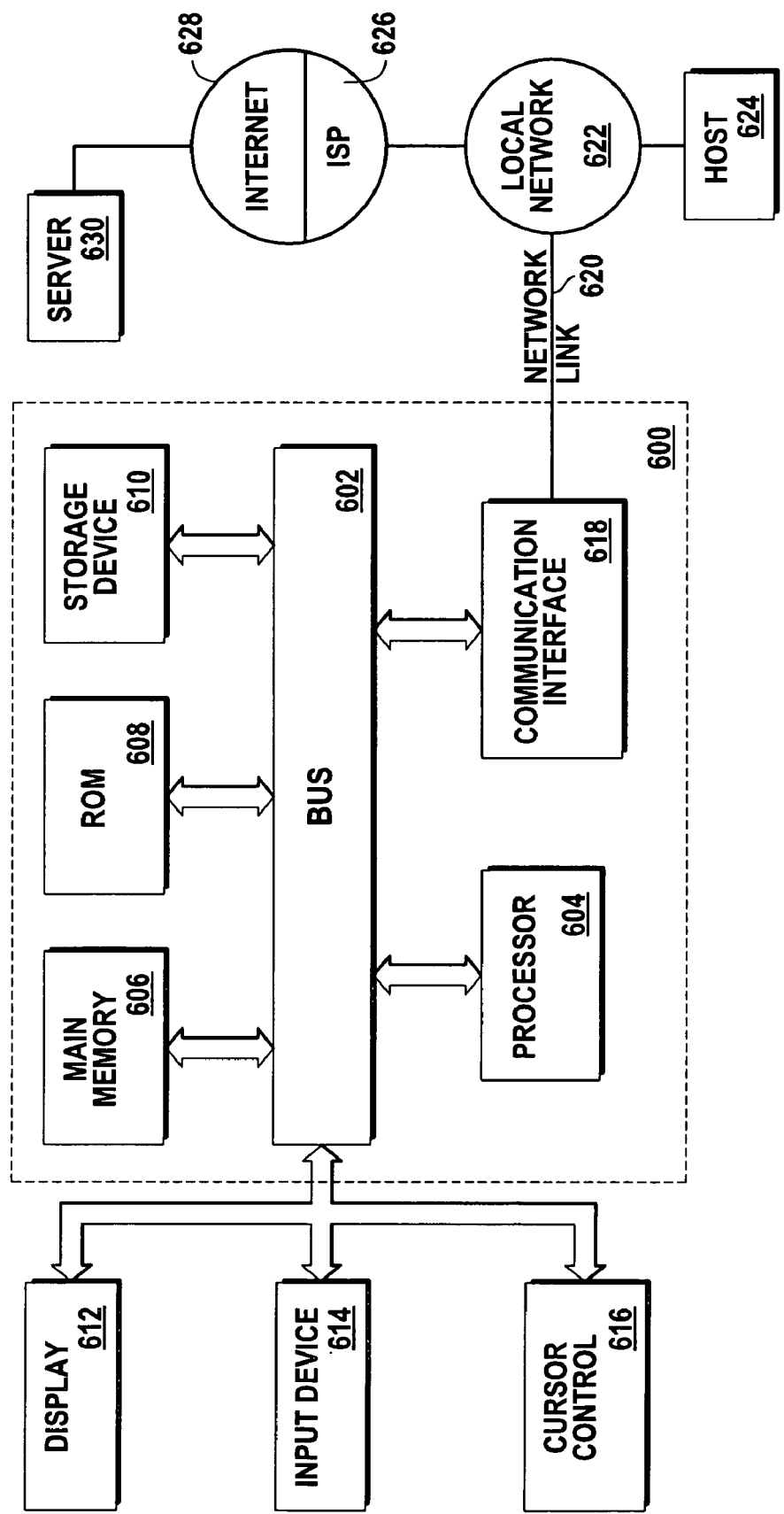
FIG. 6 is a block diagram of a general purpose computer system in which one embodiment of the present invention may be implemented.

The process described throughout FIGS. 2-4 is continuous during the operation of the JVM 101 and any Applications 150 on system 100. The use of the global dynamic output indicator allows compilation to be suppressed dynamically according to the amount of dynamic output being processed by Applications 150. The results of such a process are further illustrated by FIG. 5 and FIG. 6.

Referring now to FIG. 5A, a block diagram illustrating a processing thread during operation of a sampling mechanism according to one embodiment is shown. FIG. 5 shows a processing thread 500A according to a processing timeline during the operation of a sampling mechanism. According to one embodiment, the sampling mechanism is configured to trigger the compilation of methods at set intervals, such as 30 ms. Thus, every 30 ms, Interpreter 102 will pass control of processing thread 500A to Compiler 106. However, the sampling mechanism may also be configured to limit the amount of compilation in order to save system resources. Thus, according to one embodiment, compilation is limited to 5 ms at any given time. In this manner, when control is passed to Compiler 106 at 30 ms, compilation is performed until 35 ms. At this point, compilation is suspended and control of thread 500A is returned to Interpreter 102.

FIG. 5B is a block diagram illustrating a processing thread during the operation of both a sampling mechanism and the dynamic compilation of hot methods according to one embodiment. In FIG. 5B, processing thread 500B represents a processing thread during the compilation of hot methods. Like thread 500A, compilation by virtue of the sampling mechanism occurs between 30 ms and 35 ms. However, unlike thread 500A, compilation is not suspended during the time between 35 ms and 60 ms because Compiler 106 may trigger compilation of hot methods during this time. For instance, on thread 500B, portion A and B represent the compilation of hot methods marked in Execution Log 104. Further, according to one embodiment, there is no set time for the dynamic compilation of hot methods. Thus, compilation of methods marked in the execution log may occupy a large amount of time on thread 500B. For instance, portions A, B, C and D occupy a large majority of the time between 60 ms and 90 ms. Because much time is consumed compiling methods on thread 500B, more system resources are devoted to compilation and the rendering of dynamic may be affected. Because not enough system resources are devoted to the dynamic output, a user may detect pauses or stutter in the rendering of the dynamic output.

However, the method for reducing detectable pauses during dynamic compilation, as described above, allows Compiler 106 to selectively mark methods in Execution Log 104. For instance, if Compiler 106 does not mark any methods in Execution Log 104, compilation will not occur between 35 ms and 60 ms because processing control will never pass to Compiler 106 as described above. Instead, compilation will be limited to the sampling mechanism in between 30 ms and 35 ms much like 500A.

In this manner, the invention allows control between the scenario featured in processing thread 500A and processing thread 500B. Depending on whether dynamic output is being rendered, Compiler 106 may dynamically control the compilation of methods in order to reduce detectable pauses.

Hardware Overview

FIG. 7 is a block diagram that illustrates a computer system 700 upon which an embodiment of the invention may be implemented. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712 for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enables information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may further be a network connection that connects one or more of the components. Any mechanism and/or medium that enables information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with ROM 708 capacitively. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising: determining that dynamic output is currently being rendered to a user when an output frequency exceeds a threshold frequency, wherein the output frequency is determined by:
   invoking an output indicator each time output is rendered to the user, wherein invocation of the output indicator indicates the presence of output,
   forwarding each invocation by the output indicator to a dynamic output monitor,
   generating a ratio representing the output frequency by determining the number of instances of invocation of the output indicator within a set time, and wherein the threshold frequency is a maximum number of instances of invocation of the output indicator within the set time before compilation is suspended, and
   marking, in response to the determination, a set of instructions to not be compiled, thereby causing the set of instructions to be executed interpretively in bytecode, wherein the dynamic output is one selected from a group consisting of video and audio.

2. The machine-implemented method of claim 1, wherein the causing the set of instructions not to be compiled comprises: causing the computer system to stop marking the set of instructions for compilation, wherein marking the one or more set of instructions causes the computer system to compile the set of instructions the next time the set of instructions is processed by the computer system.

3. The machine-implemented method of claim 2, wherein compilation causes the one or more set of instructions to be converted from a first format into a second format, wherein the second format is used to execute the one or more set of instructions natively.

4. The machine-implemented method of claim 2, wherein an execution log lists the one or more a plurality of sets of instructions are sets of recently executed instructions listed in an execution log, and wherein causing the computer system to stop marking the set of instructions for compilation includes causing the computer system to stop marking any set of recently executed instructions in the execution log.

5. A machine-readable storage medium comprising a set of instruction which, when executed by at lease on processor, causes the at least one processor to perform the following operations: determining that dynamic output is currently being rendered to a user
  when an output frequency exceeds a threshold frequency, wherein the output frequency is determined by:
    invoking an output indicator each time output is rendered to the user, wherein invocation of the output indicator indicates the presence of output,
    forwarding each invocation by the output indicator to a dynamic output monitor,
    generating a ratio representing the output frequency by determining the number of instances of invocation of the output indicator within a set time, and wherein the threshold frequency is a maximum number of instances of invocation of the output indicator within the set time before compilation is suspended, and
  marking, in response to the determination, a set of instructions to not be compiled, thereby causing the set of instructions to be executed interpretively in bytecode, wherein the dynamic output is one selected from a group consisting of video and audio.

6. The machine-readable storage medium of claim 5, wherein causing the set of instructions not to be compiled comprises: causing the computer system to stop marking the set of instructions for compilation, wherein marking the set of instructions causes the computer system to compile the set of instructions the next time the set of instructions is processed by the computer system.

7. The machine-readable storage medium of claim 6, wherein compilation causes the set of instructions to be converted from a first format into a second format, wherein the second format is used to execute the set of instructions natively.

8. The machine-readable storage medium of claim 6, wherein an execution log lists a plurality of sets of recently executed instructions, and wherein causing the computer system to stop marking the set of instructions for compilation includes causing the computer system to stop marking any set of recently executed instructions in the execution log.

9. An apparatus, comprising: a persistent storage; at least one processor; and a set of instructions, which when executed by the at least one processor, causes the at least one processor to perform the following operations: determining that dynamic output is currently being rendered to a user when an output frequency exceeds a threshold frequency, wherein the output frequency is determined by:
  invoking an output indicator each time output is rendered to the user, wherein invocation of the output indicator indicates the presence of output,
  forwarding each invocation by the output indicator to a dynamic output monitor,
  generating a ratio representing the output frequency by determining the number of instances of invocation of the output indicator within a set time, and wherein the threshold frequency is a maximum number of instances of invocation of the output indicator within the set time before compilation is suspended, and
  marking, in response to the determination, a set of instructions to not be compiled, thereby causing the set of instructions to be executed interpretively in bytecode, wherein the dynamic output is one selected from a group consisting of video and audio.

10. The apparatus of claim 9, wherein causing the set of instructions not to be compiled comprises:
  causing the computer system to stop marking the set of instructions for compilation, wherein marking the set of instructions causes the computer system to compile the set of instructions the next time the set of instructions is processed by the computer system.

11. The apparatus of claim 10, wherein compilation causes the set of instructions to be converted from a first format into a second format, wherein the second format is used to execute the set of instructions natively.

12. The apparatus of claim 10, wherein an execution log lists a plurality of sets of recently executed instructions, and wherein causing the computer system to stop marking the set of instructions for compilation includes causing the computer system to stop marking any set of recently executed instructions in the execution log.

* * * * *